3,118,768
FEED PRODUCTION FOR LIVESTOCK
Earl George, Windermere, Fla., assignor to A. O. Smith Harvestore Products, Inc., Kankakee, Ill., a corporation of Delaware
No Drawing. Filed Apr. 3, 1962, Ser. No. 184,665
3 Claims. (Cl. 99—2)

This invention relates to a method of processing food products for livestock. The invention more particularly relates to a method of treating organic material, such as acidic fruit and other vegetable waste materials, which are often by-products of commercial canneries to produce a suitable long lasting feed for livestock.

In the processing and production of livestock feed from cannery wastes, such as the production of feed from citrus wastes, it has been previously found to be necessary to treat the waste derived from the canning process in a series of rather costly steps to produce a commercially valuable feed. The primary reason for the costly treatment of the cannery waste is the preservation of the citrus waste in a palatable and digestible form for long periods of time after the canning process.

The treatment which was formerly thought to be essential in preparing citrus wastes for storage preceeding feeding generally was a time consuming and expensive process. The waste, which usually consists of the pulp, rag and seed of the processed fruit and which may have a moisture content as high as 90%, is ordinarily shredded to reduce the particle size of some of the components.

Early in the development of citrus waste as an animal feed it was believed to be necessary to apply pressure to the shredded waste mass to expel as much of the moisture as was mechanically and economically possible. Mechanical filter pressing was the mode often chosen to expel moisture from the pulp. In the patent to W. M. Neal 2,548,510 it was shown that certain alkaline substances could be added to a mass of citrus waste which had a moisture content of about 85%. The alkaline substance acted, after aging in bins for a period of time, to agglomerate certain moisture retentive substances in the waste and to thereby permit the waste to be reduced by mechanical pressing to about a 60% moisture content.

In reducing the moisture content of the citrus waste to this extent by pressing fluid from the mass, it became apparent that substantial amounts of nutrient were being lost in the effluent expelled from the mass. It became obvious that the nutrients which were lost in the effluent had to be recovered and reintroduced into the pressed mass to preserve the food value of the waste. In the patent to J. M. Kuder 2,455,782 a method was set forth for treating the effluent to recover the lost nutrients. These nutrients are generally believed to comprise sugar, proteins, pectin, minerals and vitamins. By concentrating the effluent to a certain moisture level and thoroughly mixing the concentrate with the pressed waste, these nutrients were subsequently returned to the pressed waste.

Following the aging period, the mechanical pressing of the waste mass to reduce its moisture content to the lowest possible level, and the reintroduction of lost nutrients, it was formerly thought to be necessary to dry the mass to a moisture content of about 10%. This drying was ordinarily accomplished by heating the mass for long periods of time. Drying for long periods of time at relatively high heat levels often has deleterious effects on the material being treated, as it has been found that charring of the material occurred. Charring is believed to have undesirable effects on the palatability of the feed and the digestibility of its protein content. While the heat drying process is extremely expensive, it was felt that the reduction of the moisture content of the mass to a very low level was essential in the preservation of the food value of the material as a livestock feed and in the prevention of spoilage during lengthy storage periods.

It was formerly believed by some that the addition of quantities of certain chemicals to destroy or inhibit decay producing micro organisms would be beneficial in preserving the treated waste. An example of such a treatment can be found in the patent to D. B. Vincent 2,595,181. In utilizing a treatment such as this, it was felt that longer periods of storage would be obtainable without substantial losses due to spoilage.

In proceeding according to the method of the instant invention, however, most of the steps formerly thought to be essential in the production and preservation of animal feed from organic material of edible vegetable wastes, such as orange, grapefruit, tangerine and tomato pulp, can either be wholly omitted or substantially reduced in duration and expense. In the preparation, for example, of an intially acidic organic material, such as citrus waste, for storage and subsequent use as an animal feed according to the method of the instant invention, the bulky waste is usually comminuted or shredded to a size which will permit economic moisture removal. Following comminution of the waste, it is ordinarily dried in a heated drying apparatus to an intermediate moisture level. The moderately dried waste is then introduced into a storage structure and maintained at very low oxygen levels until needed.

The prepared material or feed may be stored under these conditions for long periods of time without loss of food value or palatability, and in addition, there is no evidence of the feed imparting any undesirable flavors to milk when supplied as part of the diet of milk producing animals.

The instant invention has, therefore, eliminated the costly steps of mechanically pressing the waste mass, the use of alkaline additives to facilitate such pressing and the aging of the waste mass in conjunction with the use of additives, as well as the necessity of drying the pulp to moisture levels of about 10% to preserve the material during storage. The need for recovery and reintroduction of nutrients lost in the pressed effluent is eliminated as is the necessity of adding chemical inhibitors to inactivate decay initiating micro organisms.

The following description of the method of this invention specifically considers the treatment of citrus wastes by way of example, although other organic vegetable wastes which are in the initial pH range of about 4 to 5 are within the scope of the invention.

The waste which results from the extraction of juices in the canning operation generally contains varying quantities of peel, rag, seed, and moisture. This citrus waste material ordinarily can be expected to contain from 80 to 90% moisture and to have a bulk density of about 30 to 33 lbs. per cubic foot. The pH of citrus waste ordinarily is initially in the range of about 4 to 5.

The bulky citrus waste is loaded into a modified hammer mill or food chopper where it is ground, shredded, or comminuted to a size of about ⅜ of an inch, although particle sizes of up to an inch are suitable. The citrus waste as received from a cannery is generally a non-homogeneous mass and is broken down to this size range primarily to facilitate the economic drying of the mass by establishing a relatively uniform particle size which will expose the largest possible surface area to the drying atmosphere while reducing to a minimum or eliminating the undesirable formation of fines.

When the desired size range has been obtained, the comminuted material is withdrawn from the mill or chopper and is then placed in a drying apparatus. This apparatus is preferably a rotary type dryer in which the shredded material may be continuously tumbled and subjected to a heated atmosphere within the drying chamber. The temperature of the atmosphere within the dryer should be preferably maintained in excess of 100° C. until the moisture level desired has been attained. Care must be taken during the drying operation in the application of heat to the shredded mass being dried to prevent charring and scorching of quantities of the material as this may deleteriously affect the food value and palatability of the feed derived from the citrus waste.

It has been found that the application of heat to the shredded or chopped waste is instrumental in driving off deleterious volatile substances which are believed to be terpene hydrocarbons, such as d-limonene. These substances under certain feeding conditions impart an undesirable flavor to milk when fed to dairy animals and are generally thought to make citrus waste, and in particular orange waste, less desirable as an animal feed.

The drying or evaporative process is continued until the pulp mass has reached a moisture content in the intermediate range of 30 to 70% where previously it was believed necessary to reduce the moisture level to approximately 10% for storage of the treated waste without spoilage. These moderate moisture levels of 30 to 70% can be rather rapidly and economically reached with conventional drying equipment. In reducing drying time and heat input, there is, in addition to a realization of a substantial cost saving, a considerable reduction of the exposure time of the mass in the dryer to heat which thereby greatly reduces the possibility of charring or scorching.

When the desired moisture level has been attained and this level is usually determined by factors such as shipping distances, available storage area, and diet requirements, the processed waste is removed from the dryer and as quickly as possible, preferably in not more than 24 hours, is loaded into a storage structure or container which is sealed from the atmosphere or adapted to prevent the entrance of oxygen. The structure should be capable of being maintained during the storage period in a substantially oxygen-free condition.

Shortly after the processed waste has been introduced into the storage structure or container, a rapid enzymatic reaction takes place which converts substantially all of the oxygen initially present in the storage area to $CO_2$. For best results, the storage structure should be sufficiently sealed to prevent additional oxygen from entering the structure following the enzymatic reaction. No more than 2% of free oxygen should be permitted within the structure at any time after the enzymatic reaction has taken place.

Shortly after the $CO_2$ has been produced within the structure, all further micro organic activity is halted or substantially retarded. It is believed that the production of $CO_2$ acts to bring the atmosphere within the structure or container to an equilibrium point which inhibits any further activity within the structure. Therefore, the food value and palatability of the stored material may be maintained in essentially the same condition it was in prior to the time of drying or evaporation.

In the event the material is stored in a silo-like structure, the processed material should preferably be withdrawn from the base of the structure, as needed. A discharge mechanism similar to that described in the patent to J. B. Tiedemann 2,635,770, suffices for unloading from the base of such a structure. The processed material may then be used as a feed or feed supplement for any of the large variety of livestock.

By maintaining processed vegetable waste in an essentially sealed storage structure or container, the waste may be processed at a tremendous saving in labor, time and expense as the material need only be reduced in moisture content to an intermediate moisture range. By confining the vegetable material in oxygen-free storage, waste or spoilage of the stored feed material in storage may be virtually eliminated.

Various modes of carrying out the invention are contemplated as being within the scope of the following claims particularly pointing out and distinctly claiming the subject matter which is regarded as the invention.

I claim:

1. The method of preparing and storing edible vegetable waste for livestock feed with said waste having an initial pH in the range of about 4 to 5 and an initial moisture content in the range of about 80 to 90% and selected from the group consisting of oranges, grapefruit, tangerines and tomatoes, which comprises the steps of heating the prepared waste to a temperature of at least 100° C. for a predetermined period of time to reduce the moisture content of the waste to a medium moisture range of about 30 to 70% and drive off deleterious volatile substances which may be present, and maintaining the waste in an edible condition in a substantially oxygen-free atmosphere and within the 30 to 70% moisture range until required for consumption.

2. The method of preserving for livestock feed an initially acidic edible vegetable waste having a pH in the range of about 4 to 5 and an initial moisture content in the range of about 80 to 90% and selected from the group consisting of oranges, grapefruit, tangerines and tomatoes, comprising establishing a particle size of less than about an inch, agitating the particles, heating the agitating particles at a temperature of at least about 100° C. until the moisture content of the edible vegetable waste attains a moderate moisture level of from 30% to 70%, introducing the waste into a storage container, and maintaining the container in substantially air-tight condition during storage whereby the palatability and digestibility of the waste may be maintained until required.

3. The method of processing for livestock feed a citrus waste material having an initial moisture content in the range of about 80 to 90% and an initial pH in the range of about 4 to 5, comprising shredding the material to establish a relatively uniform particle size of about ⅜ inch, tumbling the shredded material, subjecting the tumbling material to an atmosphere exceeding about 100° C. until the moisture content of the material is in the range of 30 to 70%, introducing the material into an upright silo-like storage structure, and maintaining the storage structure in substantially air-tight condition whereby the processed citrus waste may be preserved until required for consumption.

References Cited in the file of this patent

UNITED STATES PATENTS

| | | |
|---|---|---|
| 2,126,947 | Cocke | Aug. 16, 1938 |
| 2,491,495 | Hart et al. | Dec. 20, 1949 |
| 3,050,396 | Haase | Aug. 21, 1962 |